US009591525B2

(12) United States Patent
Popa et al.

(10) Patent No.: US 9,591,525 B2
(45) Date of Patent: Mar. 7, 2017

(54) EFFICIENT DEVICE HANDOVER/MIGRATION IN MESH NETWORKS

(75) Inventors: Daniel Popa, Paris (FR); Viet-Hung Nguyen, Saint-Mande (FR); Mehdi Mani, Paris (FR); Michael T. Garrison Stuber, Newman Lake, WA (US); Bastien Mainaud, Ris-Orangis (FR)

(73) Assignee: ITRON GLOBAL SARL, Liberty Lake, WA (US)

( * ) Notice: Subject to any disclaimer, the term of this patent is extended or adjusted under 35 U.S.C. 154(b) by 0 days.

(21) Appl. No.: 13/481,649

(22) Filed: May 25, 2012

(65) Prior Publication Data

US 2013/0294230 A1 Nov. 7, 2013

Related U.S. Application Data

(63) Continuation of application No. PCT/US2012/036838, filed on May 7, 2012.

(30) Foreign Application Priority Data

May 3, 2012 (EP) .................................... 12166697

(51) Int. Cl.
*H04L 12/26* (2006.01)
*H04W 28/08* (2009.01)
(Continued)

(52) U.S. Cl.
CPC ............ *H04W 28/08* (2013.01); *H04L 47/74* (2013.01); *H04L 47/743* (2013.01);
(Continued)

(58) Field of Classification Search
None
See application file for complete search history.

(56) References Cited

U.S. PATENT DOCUMENTS 5,327,576 A * 7/1994 Uddenfeldt .......... H04B 7/2643
370/333
6,463,286 B1 * 10/2002 Salminen .......... H04W 36/0066
455/432.1
(Continued)

FOREIGN PATENT DOCUMENTS

JP 2001-326658 A 11/2001
JP 2003-249937 A 9/2003
(Continued)

OTHER PUBLICATIONS

Dharia et al., (A novel distributed resource-aware scalable scheme for Scatternet formation), herein after referred to as Dharia is considered by IDS filed in Aug. 12, 2014.*
(Continued)

*Primary Examiner* — Kwang B Yao
*Assistant Examiner* — Hardikkumar Patel

(57) ABSTRACT

A new device is deployed to an area in which a network is provided. The new device may join the network using a single handshake via a neighboring device that is a member of the network and register with a network management system managing the network. If the network is overloaded or has limited bandwidth remaining, the network may refuse to admit the new device, or if the new device is isolated, may force some devices that are members of the network to leave or migrate from the network to allow the isolated device to join the network.

15 Claims, 5 Drawing Sheets

(51) Int. Cl.
*H04L 12/911* (2013.01)
*H04L 12/919* (2013.01)
*H04L 12/923* (2013.01)
*H04W 36/22* (2009.01)
*H04W 60/00* (2009.01)
*H04W 84/18* (2009.01)
*H04W 88/04* (2009.01)

(52) U.S. Cl.
CPC .......... *H04L 47/745* (2013.01); *H04L 47/762* (2013.01); *H04L 47/767* (2013.01); *H04W 36/22* (2013.01); *H04W 60/00* (2013.01); *H04W 84/18* (2013.01); *H04W 88/04* (2013.01)

(56) References Cited

U.S. PATENT DOCUMENTS

| | | | |
|---|---|---|---|
| 6,549,522 B1 * | 4/2003 | Flynn | H04L 45/00 370/313 |
| 6,889,048 B1 * | 5/2005 | Koo | H04W 72/10 370/331 |
| 7,193,991 B2 * | 3/2007 | Melpignano et al. | 370/352 |
| 7,443,835 B2 * | 10/2008 | Lakshmi Narayanan | H04L 29/06 370/331 |
| 8,130,722 B1 | 3/2012 | Breau et al. | |
| 2003/0100343 A1 | 5/2003 | Zournstos et al. | |
| 2004/0203787 A1 * | 10/2004 | Naghian | H04W 36/08 455/437 |
| 2006/0111111 A1 | 5/2006 | Ovadia | |
| 2006/0140411 A1 | 6/2006 | Zhu | |
| 2007/0147485 A1 | 6/2007 | Sakamoto et al. | |
| 2007/0177554 A1 | 8/2007 | Yang et al. | |
| 2007/0206537 A1 * | 9/2007 | Cam-Winget | H04L 63/162 370/331 |
| 2007/0211714 A1 | 9/2007 | Metke et al. | |
| 2007/0218898 A1 * | 9/2007 | Agarwal et al. | 455/433 |
| 2008/0037479 A1 | 2/2008 | Janneteau et al. | |
| 2008/0069105 A1 | 3/2008 | Costa et al. | |
| 2008/0089390 A1 | 4/2008 | Picard | |
| 2008/0092213 A1 | 4/2008 | Wei et al. | |
| 2008/0095126 A1 | 4/2008 | Mahany et al. | |
| 2008/0310366 A1 | 12/2008 | Oba et al. | |
| 2009/0170519 A1 * | 7/2009 | Wilhoite | H04M 3/42246 455/436 |
| 2010/0042707 A1 | 2/2010 | Zhao | |
| 2010/0046477 A1 | 2/2010 | Marin et al. | |
| 2010/0136983 A1 * | 6/2010 | Lu | H04W 40/22 455/446 |
| 2010/0150063 A1 * | 6/2010 | Lee | H04W 99/00 370/328 |
| 2010/0191839 A1 | 7/2010 | Gandhewar et al. | |
| 2010/0269155 A1 | 10/2010 | Droms et al. | |
| 2011/0142042 A1 * | 6/2011 | Field | 370/390 |
| 2011/0206191 A1 | 8/2011 | Tengler et al. | |
| 2011/0235627 A1 * | 9/2011 | Wang | H04L 63/0428 370/338 |
| 2012/0084446 A1 * | 4/2012 | Iinuma | H04W 36/00 709/227 |
| 2012/0170491 A1 * | 7/2012 | Kern | 370/260 |
| 2012/0263037 A1 * | 10/2012 | Li | H04L 29/12462 370/230 |
| 2013/0018993 A1 | 1/2013 | Hui et al. | |
| 2013/0294284 A1 | 11/2013 | Popa et al. | |

FOREIGN PATENT DOCUMENTS

| | | | |
|---|---|---|---|
| JP | 2003258878 A | 9/2003 | |
| JP | 2006-262206 A | 9/2006 | |
| JP | 2007081520 A | 3/2007 | |
| JP | 2010-141890 A | 6/2010 | |
| JP | 2010268322 A | 11/2010 | |
| JP | 2011-109412 A | 6/2011 | |
| JP | 2011-130387 A | 6/2011 | |

OTHER PUBLICATIONS

U.S. Appl. No. 13/481,617, filed on May 25, 2012, Daniel Popa, Mehdi Mani, Michael T. Garrison Stuber, "Authentication Using DHCP Services in Mesh Networks," 74 pages.
The Partial European Search Report mailed Sep. 26, 2012 for European patent application No. 12166697.8, 8 pages.
Orhan et al., "Measurement-Based Admission Control in Wireless Sensor Networks," Eleventh International Conference on Mobile Date Management, MDM, IEEE, May 23, 2010, pp. 426-431.
Qiu et al., "An Efficient Self-healing Process for ZigBee Sensor Networks," International Symposium on Communications and Information Technologies, 2007, ISCIT, IEEE, Oct. 1, 2007, pp. 1389-1394.
Yi et al., "Securing Wireless Sensor Networks," Third International Conference on Availability, Reliability, and Security, IEEE, Mar. 4, 2008, pp. 497-502.
Freaklabs—Open Source Wireless, IEEE 802.15.4 in the context of Zigbee—Part 2, Dec. 14, 2008, 8 pages.
Wireless Medium Access Control, IEEE 802.15.4, Speaker Chun-Yi Chen, Sep. 7, 2007, 40 pages.
Droms, "Authentication for DHCP Messages," Jun. 1, 2001; available at <<http://www.sanface.com/txt2pdf.html>>, 18 pages.
The Extended European Search Report mailed Jan. 14, 2013 for European patent application No. 12166697.8, 10 pages.
The Extended European Search Report mailed Oct. 24, 2012 for European patent application No. 12166694.5, 7 pages.
Marin-Lopez et al., "Network Access Security for the Internet: Protocol for Carring Authentication for Network Access," IEEE Communications Magazine, IEEE Service Center, Piscataway, US, vol. 50, No. 3, Mar. 1, 2012, pp. 84-92.
The PCT Search Report mailed Jan. 24, 2013 for PCT application No. PCT/US12/36838, 10 pages.
The PCT Search Report mailed Feb. 25, 2013 for PCT application No. PCT/US12/36832, 9 pages.
Office action for U.S. Appl. No. 13/481,617, mailed on Sep. 3, 2013, Popa et al., "Authentication Using DHCP Services in Mesh Networks," 10 pages.
The European Office Action mailed Jun. 27, 2014 for European Patent Application No. 12166697.8, a counterpart foreign application of U.S. Appl. No. 13/481,649, 7 pages.
Dharia, et al., "A Novel Distributed Resource-Aware Scalable Scheme for Scatternet Formation", The 11th IEEE International Conference on Networks, Sep. 28-Oct. 1, 2003, pp. 659-664.
The Australian Office Action mailed Apr. 16, 2015 for Australian Patent Application No. 2012379054, a counterpart foreign application of U.S. Pat. No. 8,755,385, 2 pages.
Examination Report for Australian Patent Appl. No. 2012379055, dated Apr. 11, 2016, 3 pages.
Notice of Acceptance mailed Apr. 20, 2016, for Australian Patent Appl. No. 2012379054, 2 pages.
Japanese Office Action mailed Mar. 29, 2016, with English translation, for Japanese Patent Application No. 2015-510241, 10 pages.
Copy of Japanese Notice of Rejection, with English translation, mailed Dec. 15, 2015, for Japanese Patent Application No. 2015-510240, 13 pages.
Office Action for U.S. Appl. No. 14/296,765, mailed on Jan. 9, 2015, Daniel Popa, "Authentication Using DHCP Services in Mesh Networks", 12 pages.
Canadian Office Action, mailed Aug. 3, 2016, for Canadian Patent Application No. 2869147, 4 pages.
Communication pursuant to Article 94(3) EPC for European Patent Appl. No. 12166694.5, dated Aug. 5, 2016, 6 pages.
Japanese Notice of Allowance, with English translation, mailed Jun. 28, 2016, for Japanese Patent Application No. 2015-510240, 6 pages.
US Office Action mailed May 19, 2016, for U.S. Appl. No. 14/880,449, 18 pages.

(56) References Cited

OTHER PUBLICATIONS

Australian Examination Report dated Sep. 5, 2016 for Australian Patent Application No. 2016200625, 2 pages.
Canadian Office Action dated Nov. 2, 2016, for Canadian Patent Application No. 2,869,150, 3 pages.
Japanese Office Action mailed Oct. 18, 2016, with English translation, for Japanese Patent Application No. 2015-510241, 6 pages.
Office Action dated Nov. 25, 2016, for U.S. Appl. No. 14/880,449, 17 pages.

* cited by examiner

EFFICIENT DEVICE HANDOVER/MIGRATION IN MESH NETWORKS

CROSS REFERENCE TO RELATED MATTERS

This application is a continuation of PCT International Application No. PCT/US12/36838, filed on May 7, 2012, which claims priority to European Patent Application No. 12166697.8, filed May 3, 2012, and entitled "EFFICIENT DEVICE HANDOVER/MIGRATION IN MESH NETWORKS," both of which are incorporated herein by reference.

BACKGROUND

With the advent of smart device technology, increasing number of smart devices have been deployed for residential, commercial and military uses nowadays. Examples of these devices include smart utility meters, sensors, control devices, routers, regulators, etc. Generally, when a new device is deployed, a technician will go to a field where the new device will be deployed and manually set up the new device in the field. The technician may, for example, configure and authenticate the new device with a network. The technician may then register the new device with the network and possibly a central server that maintains information of each device in the network.

The standard way of registration and joining a wireless network places a heavy load on the wireless network and may lead to congestion on an already heavily loaded network. The standard approach of joining a wireless network consists of three steps: first a joining node must complete 802.1x authentication, then the node communicates with a Dynamic Host Configuration Protocol (DHCP) server to acquire an internet protocol (IP) address, and finally the node contacts a network management server (NMS) to obtain required configuration information. These three steps demand heavy end-to-end packet exchange, which provides a considerable load for challenged wireless communication networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
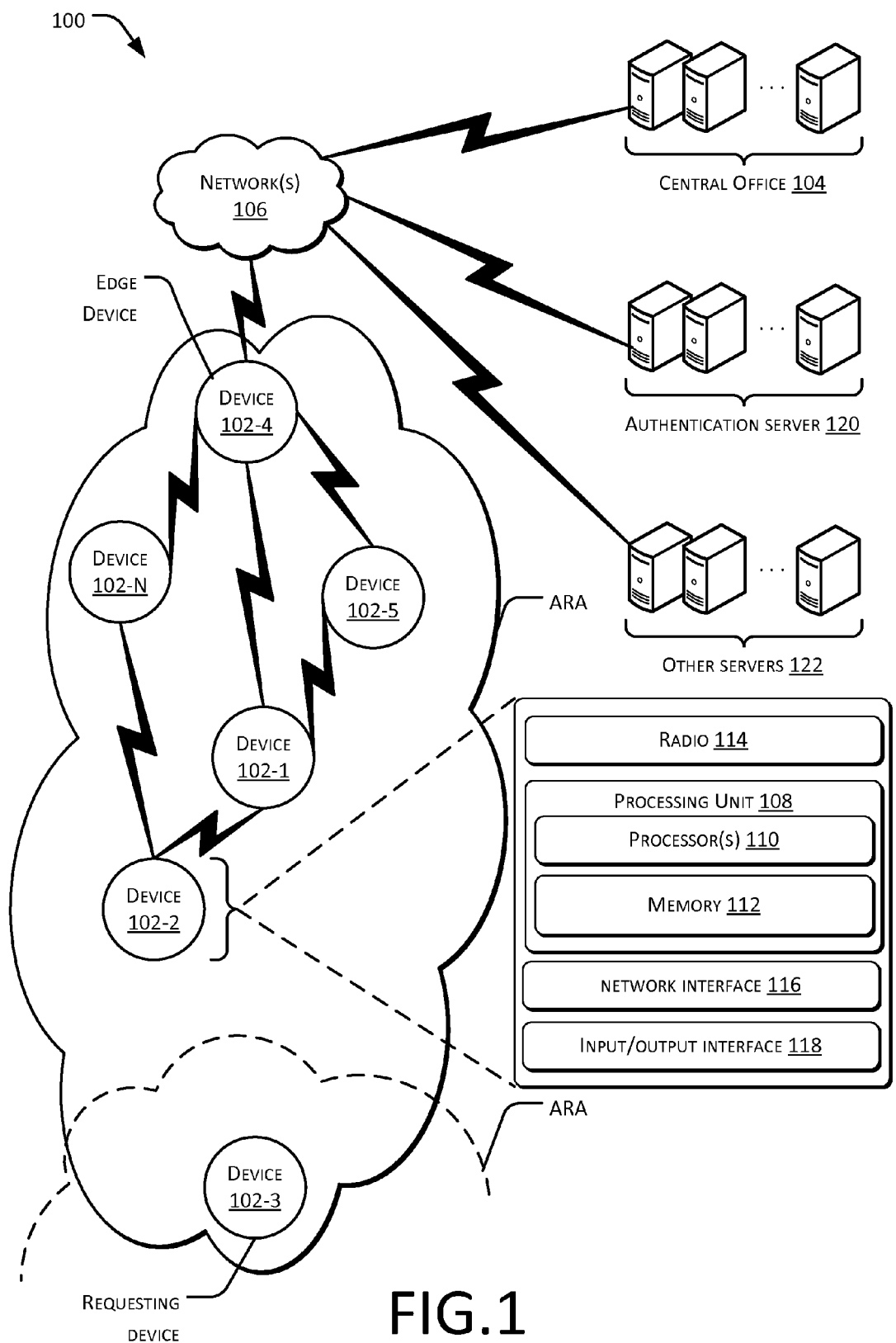
FIG. 1 illustrates an example environment usable to implement registration and/or migration of a device in a network.

As noted above, existing deployment of a new device generally requires a technician to manually configure and authenticate the new device with a network in the field, and connect the new device to the network. This connection and authentication process can be cumbersome and time consuming. The situation becomes more complicated when the network is at or near its capacity (e.g., has limited or no bandwidth remaining to support the new device). In that instance, the technician may attempt to connect the new device to another available network if any exist. These situations not only pose difficulties in deploying new devices and migrating nodes from one network to another, but also create problems in synchronizing different devices within and across networks.

This disclosure describes methods of automated device registration and device migration in an autonomous routing network. The methods allow for automatic registration of a new device to a network through a minimal number of exchanges between the new device and the network. Furthermore, the methods allow migration or handover of a device from a network to another network due to a condition of the network and/or a condition of the new device that is to be deployed in the network.

Generally, a device may request to join a network. In some implementations, the requesting device may or may not know which device associated with the network is responsible for addressing or controlling an admission of a new device to join the network. In some implementations, the requesting device may broadcast a request to join the network, which may be heard by neighboring devices (i.e., devices that are within transmission range of the requesting device). Additionally or alternatively, the requesting device may discover neighboring devices in the network by overhearing transmissions from the neighboring devices. The requesting device may then send the request directly to the neighboring devices through a message or beacon, for example.

In response to receiving the request, the neighboring device may parse the request and know that the requesting device requests to join the network. In one implementation, the neighboring device may relay the request of the requesting device to a controlling device that is responsible for addressing or controlling an admission of a new device to join the network. Alternatively, the neighboring device may relay the request to a device in the network that is a parent of the neighboring device, directing the parent device to relay the request to the controlling device, or another device that is hierarchically closer to the controlling device than the parent device. In one implementation, the neighboring device may relay the request to its parent device if, for example, the neighboring device does not know which device is responsible for addressing or controlling an admission of a new device to join the network.

Regardless of whether the request is relayed to the controlling device or the parent device, the neighboring device may insert a destination address (e.g., an IP address of the controlling device or the parent device) in the request, indicating a destination to which the request is directed.

In response to receiving the request, the controlling device associated with the network may determine whether to allow or reject the request of the requesting device to join the network. In one implementation, the controlling device may determine whether to allow or reject the request of the requesting device based on a condition of the requesting device. By way of example and not limitation, the controlling device may determine whether the requesting device is an isolated device based on information included in the received request. In one implementation, the requesting device may be determined to be isolated if the requesting device is incapable of joining networks other than the network of the controlling device. Additionally or alternatively, the requesting device may be determined to be isolated if the requesting device detects no other networks that cover the area in which the requesting device is situated. Additionally or alternatively, the requesting device may be determined to be isolated if the requesting device attempts or is forced to migrate from another network to the network of the controlling device, and this other network and the network of the controlling device are the only networks covering the area in which the requesting device is situated. Additionally or alternatively, the requesting device may be determined to be isolated if the requesting device has unsuccessfully exhausted (i.e., has been unable to join) all detected networks in its area except the network of the controlling device. Additionally or alternatively, the requesting device may be determined to be isolated if the network of the controlling device is the only network that can provide connectivity between the requesting device and servers such as Authentication, Authorization and/or Accounting (AAA) servers associated with the network.

Additionally or alternatively, the controlling device may determine whether to allow or reject the request of the requesting device to join the network based on a condition of the network. For example, the controlling device may determine whether a load on the network, such as a current number of devices, a current traffic, a current or average packet drop rate, a current or average bandwidth usage, etc., in the network is greater than or equal to a predetermined threshold. Additionally or alternatively, the controlling device may store or retrieve load or network statistics (such as current or average packet drop rate, current or average bandwidth usage, etc.) about the network and determine whether the load or network statistics (e.g., the current bandwidth usage) is greater than or equal to a predetermined threshold.

Based on the determining, the controlling device may allow or reject the request of the requesting device. For example, in response to determining that the requesting device is an isolated device, the controlling device may allow the request of the requesting device to join the network. If the controlling device further determines that the load (or the statistics) on the network, e.g., the current bandwidth usage, is/are greater than or equal to respective threshold(s), the controlling device may force one or more devices in the network to leave the network or migrate from the network to another network. By way of example and not limitation, the controlling device may select one or more devices based on knowledge of which devices in the network are capable of migrating or joining another network, and may force or request the one or more devices to leave the network of the controlling device. In this way, the controlling device may reduce the load to a sufficient or predetermined level to allow the requesting isolated device to join the network.

In response to determining to allow the request of the requesting device to join the network (regardless of the condition of the network), the controlling device may further prepare information related to joining to the network for the requesting device. The information may include, but is not limited to, a group key associated with the network, configuration information for the requesting device to set up with the network and/or a new address (such as an IP address) assigned to the requesting device, etc. The controlling device may send the information to the requesting device via the neighboring device.

The described methods allow the requesting device that wants to join the network to perform a single handshake with the network to join the network. In some implementations, the neighboring device, which is located in a neighborhood of the requesting device and is one hop away from the requesting device, may relay the request to the controlling device on behalf of the requesting device, thus saving the requesting device from randomly or aimlessly sending the request to the network. The described methods further allow smooth migration of an existing device in the network to another network, thus avoiding the network from overloading, overcrowding or exhausting resources of the network. Furthermore, the controlling device may store or retrieve other statistics such as percentage of bandwidth usage, percentage of isolated devices among all devices, etc., that are associated with the network and send a warning or alert to an administrator if one or more of these other statistics reach respective predetermined threshold(s). This facilitates the administrator to decide whether to add new supporting hardware for improving the bandwidth of the network and/or to physically re-arrange or re-locate some of the devices in the network.

In the examples described herein, the controlling device receives the request, determines whether to allow or reject the request, determines whether or not to force one or more devices in the network to leave the network, and prepares information related to enabling the requesting device to join the network. However, in other implementations, one or more other devices or services may perform some or all of these functions. For example, the controlling device may send or broadcast information of the condition of the network to part or all of devices in the network regularly or as needed. The controlling device may indicate in the sent or broadcasted information that the network will not accept admission of new devices except isolated devices. Accordingly, in one implementation, a device (e.g., the neighboring device) or service may determine whether to allow or reject the request of the requesting device to join the network, while another device or service may determine whether to force one or more devices in the network to leave the network, and yet another device or service may prepare information related to enabling the requesting device to join the network.

The application describes multiple and varied implementations. The following section describes an example environment that is suitable for practicing various implementations. Next, the application describes example systems, devices, and processes for implementing device registration and device migration.

Exemplary Environment

FIG. 1 is a schematic diagram of an example architecture 100 usable to implement device registration and device migration. The architecture 100 includes a plurality of nodes or devices 102-1, 102-2, 102-3, 102-4, 102-5, . . . , 102-N (collectively referred to as devices 102) communicatively coupled to each other via direct communication paths or "links." In this example, N represents a number of devices arranged in an autonomous routing area (ARA), such as a wide area network (WAN), metropolitan area network (MAN), local area network (LAN), neighborhood area network (NAN), personal area network (PAN), or the like. While only one ARA is shown in FIG. 1, in practice, multiple ARAs may exist and may collectively define a larger network, such as an advanced metering infrastructure (AMI) network. At any given time, each individual device may be a member of a particular ARA. Over time, however, devices may migrate from one ARA to another geographically proximate or overlapping ARA based on a variety of factors, such as respective loads on the ARAs, interference, or the like.

As discussed above, the term "link" refers to a direct communication path between two devices (without passing through or being propagated by another device). The link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The plurality of channels may comprise a control channel and multiple data channels. In some instances, the control channel is utilized for communicating one or more messages between devices to specify one of the data channels to be utilized to transfer data. Generally, transmissions on the control channel are shorter relative to transmissions on the data channels.

In one implementation, some or all of the devices 102 may be implemented as any of a variety of devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, combinations of the foregoing, or any device couplable to a communication network and capable of sending and/or receiving data.

In some implementations, some or all of the devices 102 may additionally or alternatively be implemented as any of a variety of conventional computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

In this example, the devices 102 may further be configured to communicate with a central office 104 via an edge device (e.g., the device 102-4) which serves as a connection point of the ARA to a backhaul network(s) 106, such as the Internet. In one implementation, the edge device may include, but is not limited to, a cellular relay, a cellular router, an edge router, a DODAG (Destination Oriented Directed Acyclic Graph) root, a root device or node of the ARA network, etc. In this illustrated example, the device 102-1 serves as a cellular relay and/or forwarding device for other nodes in the ARA, e.g., relaying communications from the other devices 102-2-102-N of the ARA to and from the central office 104 via the network(s) 106.

In one implementation, some or all of the devices 102 may include a processing unit 108. The processing unit 108 may include one or more processor(s) 110 communicatively coupled to memory 112. The memory 112 may be configured to store one or more software and/or firmware modules, which are executable on the processor(s) 110 to implement various functions. While the modules are described herein as being software and/or firmware stored in memory and executable on a processor, in other implementations, any or all of the modules may be implemented in whole or in part by hardware (e.g., as an ASIC, a specialized processing unit, etc.) to execute the described functions.

The memory 112 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

In one implementation, some or all of the devices 102 may additionally include a radio 114. The radio 114 comprises a radio frequency (RF) transceiver configured to transmit and/or receive RF signals via one or more of a plurality of channels/frequencies. In some implementations, some or all of the devices 102 includes a single radio 114 configured to send and receive data on multiple different channels, such as the control channel and multiple data channels of each communication link. The radio 114 may further be configured to implement a plurality of different modulation techniques, data rates, protocols, signal strengths, and/or power levels. The architecture 100 may represent a heterogeneous network of devices, in that the devices 102 may include different types of devices (e.g., smart meters, cellular relays, sensors, etc.), different generations or models of devices, and/or devices that otherwise are capable of transmitting on different channels and using different modulation techniques, data rates, protocols, signal strengths, and/or power levels.

Additionally or alternatively, in some implementations, some or all of the devices 102 may include a network interface 116, and/or an input/output interface 118. The processing unit 108 may further be configured to receive and act on data from the network interface 116, received from the input/output interface 118, and/or stored in the memory 112.

The network(s) 106, meanwhile, represents a backhaul network, which may itself comprise a wireless or a wired network, or a combination thereof. The network(s) 106 may be a collection of individual networks interconnected with each other and functioning as a single large network (e.g., the Internet or an intranet). Further, the individual networks may be wireless or wired networks, or a combination thereof.

The central office 104 may be implemented by one or more computing devices, such as servers, personal computers, laptop computers, routers, switches, etc. The one or more computing devices may be equipped with one or more processor(s) communicatively coupled to memory. In some examples, the central office 104 includes a centralized meter data management system that performs processing, analysis, storage, and/or management of data received from one or more of the devices 102. For instance, the central office 104 may process, analyze, store, and/or manage data obtained from a smart utility meter, sensor, control device, router, regulator, server, relay, switch, valve, and/or other devices.

The central office 104 may additionally or alternatively include a network management system (NMS) for maintaining a registry of devices of the AMI network, device configuration settings, version information, and the like. Although the example of FIG. 1 illustrates the central office 104 in a single location, in some examples the central office may be distributed amongst multiple locations and/or may be eliminated entirely (e.g., in the case of a highly decentralized distributed computing platform).

In one implementation, the architecture may further include an authentication server 120 responsible for authenticating identities of the devices 102 in the ARA network. In some implementations, the architecture 100 may further include other servers 122, which may control or support admission of new devices to the ARA network. In one implementation, the other servers 122 may include a security server responsible for maintaining and/or providing security services to the ARA network.

Example Device

Figure 2:
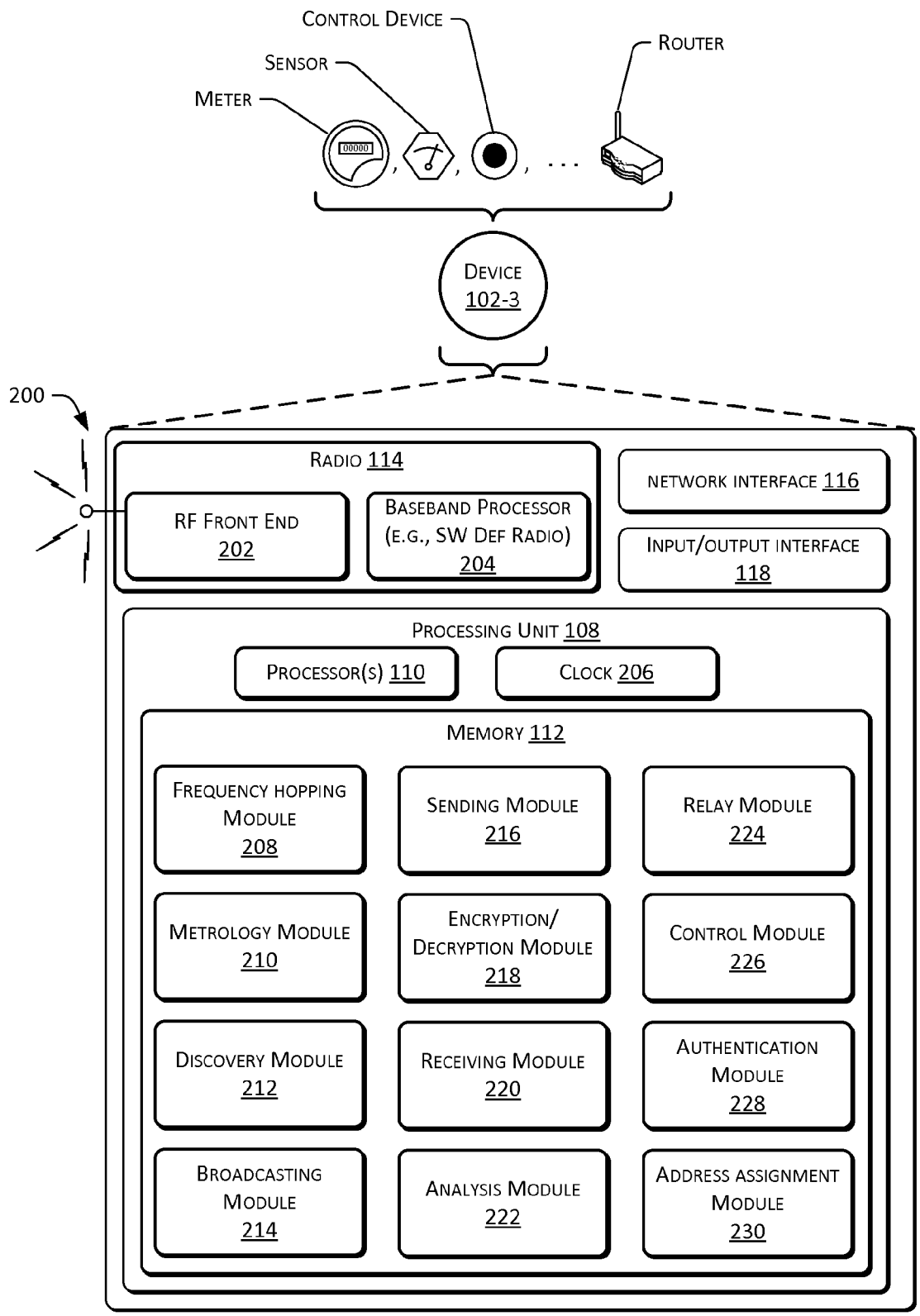
FIG. 2 illustrates the example device of FIG. 1 in more detail.

FIG. 2 is a schematic diagram showing additional details of the device 102 (e.g., representative device 102-3) of FIG. 1. In this example, the radio 114 includes an antenna 200 coupled to an RF front end 202 and a baseband processor 204. The RF front end 202 may provide transmitting and/or receiving functions. The RF front end 202 may include high-frequency analog and/or hardware components that provide functionality, such as tuning and/or attenuating signals provided by the antenna and obtained from one or more of the devices 102. The RF front end 202 may provide a signal to the baseband processor 204.

In one example, all or part of the baseband processor 204 may be configured as a software (SW) defined radio. In one example, the baseband processor 204 provides frequency and/or channel selection functionality to the radio 114. For example, the SW defined radio may include mixers, filters, amplifiers, modulators and/or demodulators, detectors, etc., implemented in software executed by a processor or application specific integrated circuit (ASIC) or other embedded computing device(s). The SW defined radio may utilize processor(s) 110 and software defined or stored in memory 112. Alternatively, the radio 114 may be implemented at least in part using analog components.

The processing unit 108 may further include a clock 206 configured to maintain a time. The clock 206 may further be configured to provide one or more count-up or count-down timers. Such timers may be used in frequency hopping among multiple communication channels.

A frequency hopping module 208 may be configured to communicate with the baseband processor 204 and the clock 206. In one example, the frequency hopping module 208 is configured to obtain time information and/or set frequency-hopping timers in the clock 206. Such time information and/or timers will indicate to the frequency hopping module 208 when to "hop" or tune a different channel or frequency. Additionally, the frequency hopping module 208 may be configured to direct the SW defined radio or other component of the radio 114 to perform the actual frequency changes. Accordingly, the frequency hopping module 208 is able to repeatedly shift between agreed upon frequencies, at agreed upon times and communicate with another device(s) for agreed upon periods of time and in agreed upon protocols.

In some implementations (e.g., when the device is a utility meter), the memory 112 may also include a metrology module 210 configured to collect consumption data of one or more resources (e.g., electricity, water, natural gas, etc.), which may then be transmitted to one or more other devices 102 for eventual propagation to the central office 104 or other destination.

The device 102 may additionally or alternatively include a discovery module 212, a broadcasting module 214, a sending module 216, an encryption/decryption module 218, a receiving module 220, an analysis module 222, a relay module 224, a control module 226, an authentication module 228, and/or an address assignment module 230, depending on a role or functionality of the device 102 in the ARA network. Details of the functions of these modules are described below.

Example Device Registration

In one implementation, prior to registering with the NMS in the central office 104 and/or becoming a member of the ARA network, a device 102 (e.g., the device 102-3) may attach to the ARA network first. By way of example and not limitation, the requesting device 102-3 may first attach to the ARA network to a point that the requesting device 102-3 may send a joining request to the ARA network, e.g., in an IP level or layer. For example, the requesting device 102-3 may first attach to the ARA network in MAC (i.e., Media Access Control) level or MAC layer. In one implementation, the requesting device 102-3 may correspond to a device, such as a smart utility meter, newly deployed to an area including the ARA network. Alternatively, the requesting device 102-3 may correspond to a device that is attempting to migrate to the ARA network from another ARA network as shown in FIG. 1.

In one implementation, the discovery module 212 of the requesting device 102-3 may actively or passively discover one or more neighboring devices 102 (e.g., the device 102-2) in a neighborhood thereof. A neighboring device of the requesting device 102-3 may include, for example, a device that is communicatively one hop away from the requesting device 102-3. That is, a neighboring device is a device with which the requesting device can communicate directly via a communication link. In one implementation, the requesting device 102-3 may perform a neighbor discovery service in a MAC layer. Additionally or alternatively, the discovery module 212 may discover the one or more neighboring devices in the neighborhood thereof through examining signals detected or received at a predetermined frequency or frequency range designated for the ARA network that the requesting device 102-3 desires to join.

Additionally or alternatively, in some implementations, the requesting device 102-3 may broadcast the request to join the ARA network using the broadcasting module 214 with or without first knowing or discovering any device in the neighborhood thereof, in an attempt that one or more devices that are within the neighborhood thereof may receive the request, and may process the request on behalf of the requesting device 102-3, and/or establish a connection with the requesting device 102-3.

Additionally or alternatively, in one implementation, the broadcasting module 214 may broadcast a presence of the requesting device 102-3, and wait for one or more devices in the ARA network that observe the presence of the requesting device 102-3 to communicate with the requesting device 102-3. In one implementation, the broadcasting module 214 may broadcast the presence of the requesting device 102-3 using a predetermined code or message in a predetermined frequency or frequency range.

Regardless of whether the requesting device 102-3 discovers one or more neighboring devices 102 or the one or more neighboring devices 102 discover the requesting device 102-3, the requesting device 102-3 may select a neighboring device 102 (e.g., the device 102-2), and send a request to join the ARA network associated with the neighboring device 102-2 to the neighboring device 102-2. In one implementation, the requesting device 102-3 may send a Dynamic Host Configuration Protocol version 6 (DHCPv6) or DHCPv4 request to the neighboring device 102-2 through the sending module 216. Alternatively, the requesting device 102-3 may include the join request in a beacon message and send the beacon message to the neighboring device 102-2 through the sending module 216.

The requesting device 102-3 may or may not know an address (e.g., an Internet Protocol (IP) address) of a controlling device associated with the ARA network that is responsible for controlling an admission or addition of a new device to the ARA network. The controlling device in this example may comprise the edge device 102-4, a DHCP server or another device outside the ARA. Specifically, the join request or the beacon message may or may not include a destination address of the controlling device associated with the ARA network to which the join request of the requesting device 102-3 needs to finally be directed.

In some implementations, the requesting device 102-3 may encrypt all or part of the join request or the beacon message by an encryption key using the encryption/decryption module 218. The encryption key may comprise a private key or a symmetric key. In one implementation, each of the devices 102 (whether a device that is a member of the ARA network or a device that is allowable to join the ARA network) may share the same public/private key-pair or the same symmetric key during or after manufacture thereof. In some implementations, each of the devices 102 (whether a device that is a member of the ARA network or a device that is allowable to join the ARA network) may have an encryption/decryption key or symmetric key selected from a predetermined pool of encryption/decryption keys accessible by each of the devices 102. In one implementation, each of the devices 102 (whether a device that is a member of the ARA network or a device that is allowable to join the ARA network) may have an encryption/decryption key or symmetric key that is known only to itself and one or more other devices and/or servers (such as the central office 104, the authentication server 120, and/or the controlling device of the ARA network, etc.). In other implementations, the requesting device 102 may send the join request or the beacon message without encryption, i.e., in a plain format.

Additionally or alternatively, in one implementation, the join request may include, but is not limited to, an identifier of the requesting device 102-3 and/or authentication information, such as an authentication signature, a nonce or an arbitrary value that is signed or encrypted using a predetermined key (e.g., the above encryption key, symmetric or public key) that has been registered in the requesting device 102-3 and known to the ARA network, the controlling device of the ARA network, the NMS in the central office 104 and/or the authentication server 120. In some implementations, the join request may further include a message, a code, or other indicator that indicates whether the requesting device 102-3 is an isolated device. By way of example and not limitation, the requesting device 102-3 may be determined to be isolated if the requesting device 102-3 is incapable of joining networks (not shown) other than the ARA network. Additionally or alternatively, the requesting device 102-3 may be determined to be isolated if the requesting device 102-3 detects no other networks that cover an area in which the requesting device 102-3 is situated. Additionally or alternatively, the requesting device 102-3 may be determined to be isolated if the requesting device 102-3 attempts to migrate from another network (as shown in FIG. 1) to the ARA network and this another network and the ARA network are the only networks covering the area in which the requesting device 102-3 is situated. Additionally or alternatively, the requesting device 102-3 may be determined to be isolated if the requesting device 102-3 has exhausted (i.e., has tried and failed to join) all detected networks in its area except the ARA network. Additionally or alternatively, the requesting device 102-3 (i.e., has failed to join) is isolated if the ARA network is the only network that is able to provide connectivity between the requesting device 102-3 and one or more servers such as NMS and DHCP servers, for example.

In some implementations, upon sending the join request to the neighboring device 102-2, the requesting device 102-3 waits for a response from the ARA network via the neighboring device 102-2. The response may indicate whether the join request of the requesting device 102-3 to join the ARA network is allowed or rejected. If the response indicates that the join request of the requesting device 102-3 is rejected or denied, the requesting device 102-3 may explore another ARA network and send a joining request to the other ARA network that the requesting device 102-3 may find.

In an event that the join request is allowed, the response may include, for example, a group key associated with the ARA network, configuration information for the requesting device 102-3 to join the ARA network, and/or an address (e.g., an Internet Protocol (IP) address) that is assigned to the requesting device 102-3. Additionally or alternatively, in some implementations, the response may include address information of one or more devices 102 within the ARA network, including, for example, address information of devices along one or more paths designated by the controlling device for routing data packets from requesting device 102-3 within the ARA network, and/or address information of the controlling device associated with the ARA network. In one implementation, part or all of the response (e.g., the group key, etc.) may be encrypted using the symmetric key of the requesting device 102-3. Additionally or alternatively, part or all of the response (such as the address information of the controlling device, for example) may be encrypted using the group key associated with the ARA network.

In some implementations, the requesting device 102-3 may only perform a single handshake or exchange (i.e., a single upstream message for the join request and a single downstream message for response to the join request), using the DHCPv6 or DHCPv4 protocol, for example, with the ARA network (e.g., the neighboring device 102-2 of the ARA network) to achieve joining to the ARA network. In one implementation, the requesting device 102-3 and/or the ARA network may achieve mutual authentication (i.e., authentication of an identity of the requesting device 102-3 by the ARA network or the authentication server 120, and authentication of an identity of the ARA network by the requesting device 102-3) using this single handshake or exchange.

By way of example and not limitation, if the symmetric or asymmetric key (e.g., the public/private key) of the requesting device 102-3 is known (or is supposed to be known) only to the requesting device 102-3 and one or more other devices and/or servers (e.g., the authentication server 120, the central office 104 and/or the controlling device) that are associated with the ARA network, the requesting device 102-3 and the ARA network may authenticate each other by using the symmetric or asymmetric key of the requesting device 102-3. For example, the ARA network may authenticate an identity of the requesting device 102-3 if the authentication server 120, for example, can successfully decrypt a nonce or a signature (which may be included in the join request) that has been encrypted using the symmetric or asymmetric key (e.g., the public key) of the requesting device 102-3. Furthermore, the requesting device 102-3 may authenticate the ARA network if, for example, the requesting device 102-3 can successfully decrypt an encrypted group key (or other information such as the previously sent nonce or signature included in the response to the join request, for example) that has been encrypted using the symmetric or asymmetric key (e.g., the public key) of the requesting device 102-3. In some implementations, if an encrypted group key is used as a source of authenticating the ARA network, the requesting device 102-3 may further determine an authenticity of the ARA network if the requesting device 102-3 can successfully communicate with other devices in the ARA network using the decrypted group key. In an alternative implementation, the requesting device 102-3 may perform a plurality of handshakes or exchanges with the ARA network, possibly using one or more protocols such as TCP/IP protocol and/or other Internet protocols, to achieve joining to the ARA network.

In one implementation, the neighboring device 102-2 may receive the join request sent or broadcasted from the requesting device 102-3 through the receiving module 220 of the neighboring device 102-2. If the join request or the beacon message is encrypted, the neighboring device 102-2 may decrypt the join request or the beacon message using the encryption/decryption module 218 of the neighboring device 102-2. The neighboring device 102-2 may parse the (decrypted or originally plain if unencrypted) join request and determine through the analysis module 222 that the requesting device 102-3 is requesting to join the ARA network.

In some implementations, in response to determining that the requesting device 102-3 requests to join the ARA network of the neighboring device 102-2, the neighboring device 102-2 may relay the join request to the controlling device associated with the ARA network (e.g., the device 102-4). In one implementation, the neighboring device 102-2 may know an address (e.g., an IP address) of the controlling device and may relay the join request to the controlling device through the relay module 224. By way of example and not limitation, the relay module 224 may include a relay agent, e.g., a DHCPv6 relay agent, to relay the (DHCPv6) join request sent from the requesting device 102-3 to the controlling device. For example, the relay module 224 of the neighboring device 102-2 may insert the IP address of the controlling device as a destination address of a data packet including the join request of the requesting device 102-3 and relay the data packet to the controlling device directly or indirectly through a parent device of the neighboring device 102-2.

Alternatively, if the neighboring device 102-2 does not know the address of the controlling device, the relay module 224 of the neighboring device 102-2 may relay the data packet (which includes the request of the requesting device 102-3) to the parent device of the neighboring device 102-2 in the ARA network by, for example, inserting an IP address of the parent device, and directing or allowing the parent device of the neighboring device 102-2 to relay the join request of the requesting device 102-3 to the controlling device.

Additionally or alternatively, regardless of whether the join request is relayed to the controlling device or the parent device of the neighboring device 102-2, the neighboring device 102-2 may further encrypt the relayed request using an encryption key of the neighboring device 102-2. In one implementation, this encryption key may include a group key associated with the ARA network and distributed to each device 102 in the ARA network. In some implementations, this encryption key may include an encryption key selected from the pool of encryption/decryption keys accessible by each device 102 of the ARA network and/or assigned to the neighboring device 102-2. In some other implementations, the neighboring device 102-2 may relay the request in a plain format, i.e., without encryption. In one implementation, the neighboring device 102-2 may use an address thereof as a source address of the request (or replace the source address of the join request of the requesting device 102-3 by the address of the neighboring device 102-2) that the neighboring device 102-2 is going to relay on behalf of the requesting device 102-3. This allows proper forwarding of a reply from other devices or servers associated with the ARA network back to the requesting device 102-3. For example, a response or reply (e.g., for the join request) to the requesting device 102-3 may use the address of the neighboring device 102-2 as the destination address, and request the neighboring device 102-2 to forward or relay the response or reply to the requesting device 102-3 accordingly.

In some implementations, the neighboring device 102-2 relays the join request of the requesting device 102-3 regardless of a condition of the ARA network and/or a condition of the requesting device 102-3. Additionally or alternatively, in some implementations, the neighboring device 102-2 may receive an instruction from the controlling device 102-4, indicating that the ARA network may not accept admission of a new device to the ARA network unless the new device to be added or joined to the ARA network is an isolated device. In this latter case, the analysis module 222 of the neighboring device 102-2 may further determine whether the requesting device 102-3 is an isolated device based on, for example, the join request received by the receiving module 220. In response to determining that the requesting device 102-3 is not an isolated device, the neighboring device 102-2 may send a response or feedback to the requesting device 102-3 indicating that the request of joining to the ARA network is rejected because, for example, the neighboring device 102-2 has previously received from the controlling device 102-4 an instruction to reject admission of new devices except isolated devices.

In some implementations, in response to receiving the relayed request from the neighboring device 102-2, the controlling device associated with the ARA network may determine whether to allow or reject the join request of the requesting device 102-3 based on a condition of the ARA network. The controlling device may determine whether to allow or reject the join request of the requesting device 102-3 using the control module 226. In one implementation, the controlling device may play a role of admission control authority. In one implementation, the controlling device may comprise root or edge device (e.g., device 102-4) of the ARA network, a router of the ARA network, or may be distributed in one or more nodes of the ARA networks. In some implementations, the controlling device may alternatively be situated in a backend device such as the central office 104, a root of a routing tree of one or more ARA networks manageable by the central office 104, or another server 122 that may be affiliated with the central office 104. In some implementations, the controlling device may include a DHCP or DHCPv6 server, which may be included in one or more of the other servers 122. In one implementation, in an event that the controlling device does not include a DHCP or DHCPv6 server, or include one or more functions of the DHCP or DHCPv6 server, the controlling device may relay the join request to the DHCP or DHCPv6 server. In some implementations, the controlling device may include a combination of one or more devices including the DHCP or DHCPv6 server, a root device, an edge device, a router, a backend device such as the central office 104 or another server 122. For ease of reference in this application, device 102-4 will be referred to as the controlling device. Device 102-4 is representative of a root node, edge router, or other edge device of the ARA network, which couples the ARA network to the central office 104 via the backhaul network 106.

In some implementations, in response to receiving the relayed request from the neighboring device 102-2, the controlling device 102-4 may determine whether to allow or reject the request of the requesting device 102-3 based on whether a load on the ARA network exceeds a predetermined threshold. By way of example and not limitation, the controlling device 102-4 may determine whether to allow or reject the request of the requesting device 102-3 based on whether the ARA network is overloaded (e.g., whether a current number of devices in the ARA network is greater than or equal to a predetermined threshold for accommodation). Additionally or alternatively, the controlling device 102-4 may determine whether to allow or reject the request of the requesting device 102-3 based on whether statistics (such as a current/average bandwidth usage, a current/average collision rate, a current/average drop rate of data packets, a current/average data traffic, etc.) of the ARA network is greater than or equal to a predetermined threshold for the statistics.

In one implementation, in response to determining that the load on the ARA network exceeds the predetermined threshold (e.g., the statistics is greater than or equal to the predetermined threshold for the statistics), the controlling device 102-4 may reject the (DHCP or DHCPv6) join request of the requesting device 102-3. Alternatively, in some implementations, the controlling device 102-4 may further determine whether the requesting device 102-4 is an isolated device based on, for example, information in the received request. The information in the received request may include, for example, an indicator indicating that the requesting device 102-3 is an isolated device. In response to determining that the requesting device 102-3 is an isolated device, the controlling device 102-4 may allow the requesting device 102-3 to join the ARA network regardless of the condition of the ARA network (i.e., regardless of whether the load on the ARA network exceeds the predetermined threshold).

In some implementations, the controlling device 102-4 may further determine an authenticity of the requesting device 102-3 using the authentication module 228. For example, the authentication module 228 of the controlling device 102-4 may determine an authenticity of the requesting device 102-3 based on the identifier of the requesting device 102-3 or the authentication signature included in the received request. Additionally or alternatively, the controlling device 102-4 may parse the request and send the identifier and/or the authentication signature of the requesting device 102-3 to an authentication server such as a security server or Authentication, Authorization and Accounting (AAA) server 120. The security server or the AAA server 120 is responsible for authenticating identities of devices joining one or more ARA networks (including the current ARA network) that are managed by the central office 104, for example. In one implementation, the security server or the AAA server 120 may be located outside the ARA network. In some implementations, the security server or the AAA server 120 may be another node or device (e.g., the device 102-1) within the same ARA network of the controlling device 102-4. The controlling device 102-4 may send information including the identifier and/or the authentication signature of the requesting device 102-3 to the security server or the AAA server 120 using a networking protocol such as RADIUS (i.e., Remote Authentication Dial In User Service), for example. For ease of reference in this application, the AAA server is used as an example to describe operations of authenticating identities of devices joining one or more ARA networks.

In one implementation, upon successfully authenticating the identity of requesting device 102-3 based on the identifier and/or the authentication signature of the requesting device 102-3, for example, the AAA server 120 may send a message to the controlling device 102-4 or the DHCP server associated or connected with the controlling device 102-4, indicating that the identity of the requesting device 102-3 is successfully authenticated. Additionally or alternatively, in some implementations, the AAA server 120 may further send a group key (e.g., a group link-layer key) associated with the ARA network to the controlling device 102-4 or the DHCP server of the controlling device 102-4. Additionally or alternatively, the AAA server 120 may send the message signed or encrypted by the group key (e.g., a group link-layer key) associated with the ARA network to the controlling device 102-4 or the DHCP server associated with the controlling device 102-4. In one implementation, the controlling device 102-4 may have previously stored the group key associated with the ARA network, and may therefore decrypt the encrypted message using the group key. In one implementation, the controlling device 102-4 may not have information of the public or symmetric key of the requesting device 102-3. In that instance, the AAA server 120 may encrypt the group key using a public or symmetric key of the requesting device 102-3, and encrypt the message (including the encrypted group key) using the group key associated with the ARA network to the controlling device 102-4, which may forward the group key that has been encrypted using the public or symmetric key of the requesting device 102-3 to the requesting device 102-3.

In one implementation, if the controlling device 102-4 and the DHCP server are separate devices, the AAA server 120 may send the message to the DHCP server associated with the controlling device 120-4 (e.g., after the authentication request was sent from the DHCP server or from the controlling device 102-4 through the DHCP server). In response to receiving the message, the DHCP server may analyze the message and determine whether the identity of the requesting device 102-3 is authenticated. Additionally or alternatively, the DHCP server may relay the message to the controlling device 102-4. In some implementations, the AAA server 120 may send the message to the controlling device 102-4 directly if the authentication request was sent from the controlling device 102-4 (or from the controlling device 102-4 through the DHCP server if the controlling device 102-4 and the DHCP server are separate devices). Regardless of whether the message is relayed from the DHCP server or directly sent from the AAA server 120, in one implementation, in response to receiving the message from the AAA server 120, the controlling device 102-4 may analyze the message and determine whether the identity of the requesting device 102-3 is authenticated. In response to determining that the identity of the requesting device 102-3 is authenticated, the controlling device 102-4 may send a message, which may or may not be encrypted using a public key or symmetric key of the requesting device 102-3 (which may depend on whether the controlling device 102-4 has the public or symmetric key of the requesting device 102-3, for example) as described in foregoing implementations, to the requesting device 102-3 indicating that the identity of the requesting device 102-3 is authenticated and/or the requesting device 102-3 is allowed to join the ARA network. Additionally or alternatively, in some implementations, the controlling device 102-4 may encrypt the message using the group key associated with the ARA network, which may later be decrypted and parsed by the neighboring device 102-2 to the requesting device 102-3. In one implementation, the message may further include, for example, a group key associated with the ARA network and other information that may or may not be encrypted using the public or symmetric key of the requesting device 102-3, such as the encrypted group key received from the AAA server 120, for example. In some implementations, in response to receiving the message, the requesting device 102-3 may decrypt the message if encrypted (for example using the public or symmetric key of the requesting device 102-3) and retrieve the group key associated with the ARA network. Additionally or alternatively, the requesting device 102-3 may decrypt the encrypted group key (such as the group key encrypted at the AAA server 120 using the public or symmetric key of the requesting device 102-3) to retrieve the group key. The requesting device 102-3 may then be allowed to send and/or receive data (for example, data encrypted using the group key, etc.) with other devices of the ARA network.

In some implementations, the controlling device 102-4 (or the DHCP server associated with the controlling device 102-4) may further send a registration request to the NMS using the sending module 216. The registration request may include, for example, the identifier of the requesting device 102-3, which may be signed or encrypted using a private key (of public/private keys) associated with the controlling device 102-4, the group key associated with the ARA network, and/or the key associated with the requesting device 102-3. In one implementation, the controlling device 102-4 may send the registration request to the NMS in a plain, unencrypted format.

Upon receiving the registration request from the controlling device 102-4, the NMS may decrypt the message if the message is encrypted, parse the message and obtain the identifier of the requesting device 102-3. In some implementations, the NMS may further retrieve information associated with requesting device 102-3 and/or information associated with the ARA network. In one implementation, the NMS may determine configuration information or parameters usable for the requesting device 102-3 to join or set up with the ARA network based on the retrieved information. The retrieved information may include, but is not limited to, a model type or device type of the requesting device 102-3, a type of the ARA network the requesting device 102-3 is requesting to join, etc. Additionally or alternatively, the NMS may send the configuration information or parameters to the controlling device 102-4 or the DHCP server of the controlling device 102-4.

In one implementation, in response to receiving the configuration information or parameters from the NMS, the address assignment module 230 of the controlling device 102-4 (or the DHCP server) may determine a new address (e.g., a new IP address such as IPv6 address) for the requesting device 102-3. In one implementation, the controlling device 102-4 (or the DHCP server) may determine the new address based on a prefix assigned to a relay agent that the controlling device 102-4 (or the DHCP server) may employ, for example. Additionally or alternatively, the controlling device 102-4 (or the DHCP server) may determine the new address based on a prefix designated to or shared by devices in the ARA network of the controlling device 102-4. In one implementation, the new address that is assigned to the requesting device 102-3 may include the prefix that is assigned to the relay agent of the controlling device 102-4 (or the DHCP server), or designated to or shared by each device in the ARA network. In some implementations, the controlling device 102-4 (or the DHCP server) may further generate a random number and use this random number for the rest of the new address. Additionally or alternatively, the controlling device 102-4 (or the DHCP server) may have previously reserved and stored a plurality of addresses (e.g., IPv6 addresses) to be used for devices adding to the ARA network. The controlling device 102-4 (or the DHCP server) may then randomly or sequentially select an address from the plurality of addresses for assigning to the requesting device 102-3.

Additionally or alternatively, in some implementations, upon determining the new address to be assigned to the requesting device 102-3, the controlling device 102-4 (or the DHCP server) may further check this new address with a DNS (i.e., Domain Name System) server to determine whether this new address is currently assigned to any other device. In one implementation, the controlling device 102-4 (or the DHCP server) may send the new address and the identifier of the requesting device 102-3 to the DNS server. If the controlling device 102-4 (or the DHCP server) receives a reply from the DNS server, indicating that the new address is currently assigned to another device, the controlling device may re-determine another new address for the requesting device 102-3 and check the re-determined new address with the DNS server to ensure the availability of the re-determined new address. If the new address or the re-determined new address is available, the DNS server may register the new address or the re-determined new address with the identifier of the requesting device 102-3 and reserve the new address or the re-determined new address for the requesting device 102-3.

In one implementation, upon confirming the new address to be assigned to the requesting device 102-3, the controlling device 102-4 may provide a reply (e.g., a DHCP reply) to the requesting device 102-3. By way of example and not limitation, the reply may include, but is not limited to, the assigned address (e.g., the assigned IPv6 global address), the group key (e.g., the group link-layer key) associated with the ARA network, and/or the configuration information or parameters usable for the requesting device 102-3 to join or set up with the ARA network. In one implementation, the controlling device 102-4 (or the DHCP server) may send the reply to the requesting device 102-3. In some implementations, with or without the knowledge of a global address of the requesting device 102-3 (e.g., since the new address has not been assigned to the requesting device 102-3 yet), the controlling device 102-4 (or the DHCP server) may send the reply to the requesting device 102-3 via the neighboring device 102-2 (and the router heading the ARA network if the controlling device 102-4 is situated outside the ARA network). For example, the controlling device 102-4 (or the DHCP server) may send the reply to the neighboring device 102-2 and request that the neighboring device 102-2 relay the reply to the requesting device 102-3. The neighboring device 102-2, which has established communication with the requesting device 102-3, may then relay the reply to the requesting device 102-3 through a message using the DHCPv6 protocol or a beacon message. Additionally or alternatively, the neighboring device 102-2 may broadcast the reply in a neighborhood thereof, and the requesting device 102-3, which is neighboring to the neighboring device 102-2, may receive the broadcasted reply and parse the reply to obtain such information as the assigned new address, etc., to join the ARA network.

Upon receiving the reply to the join request, the requesting device 102-3 may configure configuration parameters for communication within the ARA network based on, for example, the configuration information or parameters included in the reply. For example, the requesting device 102-3 may attach to a routing topology into the ARA network by deciding which routing path and/or neighboring device to use if more than one routing path and/or neighboring devices are available. Additionally or alternatively, the requesting device 102-3 may send a message to the root node of the ARA network to notify its arrival to the ARA network, for example. The requesting device 102-3 may or may not request or need an acknowledgement from the root node. In an event that an acknowledgement from the root node is requested or needed, the requesting device 102-3 may wait for an acknowledgement sent from the root node. In one implementation, if no acknowledgement is received from the root node for a predetermined period of time, the requesting device 102-3 may resend the message to the root node. The requesting device 102-3 may resend the message for a predetermined number of receipt failures of acknowledgement. Additionally or alternatively, the requesting device 102-3 may select a different routing path and/or neighboring device 102 to forward or relay the message to the root node. Upon receiving an acknowledgement from the root node, the requesting device 102-3 may start performing normal operations in the ARA network, including, for example, routing and/or forwarding packets that are not destined to the requesting device 102-3, processing packets addressed to the requesting device 102-3, replying for packets (if requested) that are destined to the requesting node 102-3, etc. If no acknowledgement is received from the root node for a predetermined number of retries, the requesting device 102-3 may start performing normal operations as if an acknowledgement has been received from the root node, resending the arrival message again after a predetermined time interval, or deciding to migrate migrating to another adjacent ARA network if available, etc.

Example Device Migration

In some implementations, a device 102 within an ARA network may decide or initiate to leave or migrate from the ARA network to another ARA network. By way of example and not limitation, the device 102 may decide or initiate to leave or migrate from an ARA network (where the device 102 is currently attached) to another ARA network based on one or more network conditions associated with the device 102 and/or the ARA network. For example, the device 102 may initiate to migrate from the ARA network to another ARA network if a communication quality (e.g. a link-layer communication quality) with the device 102 is poor or degraded, for example, below a predetermined quality threshold. Additionally or alternatively, the device 102 may migrate from the ARA network to another ARA network if the router of the ARA network fails. Additionally or alternatively, the device 102 may, while attached to the current ARA network, listen in an environment thereof, and detect or discover existence of other adjacent ARA networks. The device 102 may learn about performance such as quality of service (QoS) offered by these adjacent networks. The device 102 may migrate from the ARA network to another ARA network if the other ARA network offers a better performance such as quality of service than the ARA network to which the device 102 is currently attached. In one implementation, the device 102 may select an adjacent ARA network for migration based on one or more policies or criteria. Examples of these policies or criteria may include, but are not limited to, selecting a network that offers at least a predetermined amount or percentage of improvement over performance such as QoS, time or response latency, throughput, packet drop rate, etc., as compared to the ARA network to which the device 102 is currently attached.

Additionally or alternatively, the device 102 may be forced by the controlling device 102-4 (or a device 102 in the ARA network such as the router heading the ARA network) to migrate from the ARA network to another ARA network for administrative reasons associated with the ARA network such as overcrowding or overloading of devices in the ARA network, degradation in performance (e.g., increased packet drop rate, decreased available bandwidth, increased collision rate, etc.) associated with the ARA network, load balancing between the ARA network and the another network, etc. Additionally or alternatively, the controlling device 102-4 may force the device 102 to migrate from the ARA network to another ARA network if the ARA network is full (e.g., a current load on the ARA network is greater than or equal to a predetermined threshold) and a new device requesting to join the ARA network is an isolated device.

In one implementation, in an event that the controlling device 102-4 may need to force some device 102 to leave the ARA network or migrate to another ARA network, the controlling device 102-4 may determine which one or more devices 102 in the ARA network to leave or to migrate by randomly selecting a device 102 from the ARA network. In some implementations, the controlling device 102-4 may select one or more devices to leave or migrate based on information associated with each device in the ARA network. In one implementation, the controlling device 102-4 may store the information associated with each device 102 in the ARA network when the respective device 102 joins the ARA network.

Additionally or alternatively, the controlling device 102-4 may survey each device in the ARA network in response to deciding to force one or more devices 102 in the ARA network to leave or migrate to another ARA network. Additionally or alternatively, the controlling device 102-4 may query the devices 102 in the ARA network to determine which of them is/are capable of leaving or migrating from the ARA network. Additionally or alternatively, the controlling device 102-4 may retrieve topology information associated with each device 102 in the ARA network from the central office 104 or any device or node that is hierarchically upstream from the controlling device 102-4. In one implementation, the information associated with each device 102 may include, but is not limited to, whether the respective device 102 is an isolated device, whether the respective device 102 has a child device (i.e., device that is hierarchically downstream from the respective device 102), how many child devices the respective device 102 has, etc.

In response to retrieving information associated with each device 102 in the ARA network or receiving reply from devices in the ARA network, the controlling device 102-4 may select which one or more devices 102 in the ARA network to leave or migrate based on one or more heuristics strategies. By way of example and not limitation, the controlling device 102-4 may select one or more devices 102 that are not isolated as indicated in the information. Additionally or alternatively, the controlling device 102-4 may select one or more devices 102 that have fewer child devices, for example, fewer than a predetermined threshold number. Additionally or alternatively, the controlling device 102-4 may select a predetermined number (e.g., one, two, etc.) of the first few devices 102 that have fewer than a threshold number of child devices. Additionally or alternatively, the controlling device 102-4 may select one or more devices that are farthest away from the controlling device 102-4 based on routing information, for example.

Upon selecting the one or more devices 102 to leave or migrate from the ARA network, the controlling device 102-4 may send an instruction or request to the one or more devices 102 to leave or migrate from the ARA network. In one implementation, the controlling device 102-4 may send the instruction or request to a device 102 and send the instruction or request to another device 102 if the former device 102 cannot leave or migrate from the ARA network for some reason (e.g., the first device would become isolated if it were forced to leave the current ARA network). In some implementations, the controlling device 102-4 may send the instruction or request to more than one (or a predetermined number of) devices 102 to avoid the problem of resending the instruction or request to other devices 102 in an event that the previously sent instruction or request cannot be fulfilled by a previously instructed or requested device.

In one specific example, the controlling device 102-4 may select the device 102-5 to leave or migrate from the ARA network. In response to receiving the migration instruction or request, the device 102-5 may determine whether there are one or more other ARA networks that the device 102-5 may migrate to. For example, the device 102-5 may use the discovery module 212 and the broadcasting module 214 to determine whether there are neighboring devices belonging to other ARA networks. If the device 102-5 is unable to find other ARA networks to migrate to, the device 102-5 may send a message to the controlling device 102-4, refusing to leave the ARA network of the controlling device 102-4 since doing so would result in the device 102-5 becoming isolated.

Alternatively, the device 102-5 may detect another ARA network but determine that the quality of communication with this other ARA network is poor or sporadic. In that case, the device 102-5 may send a message to the controlling device 102-4 indicating that the device 102-5 is unable to leave or migrate from the ARA network. Additionally or alternatively, at the time of receiving the migration instruction or request, the device 102-5 may determine that the device 102-5 is busy in processing, receiving, and/or transmitting data that may need a certain period of time greater than or equal to a predetermined time threshold. In response thereto, the device 102-5 may send a message to the controlling device 102-4 that the device 102-5 is unable to leave or migrate from the ARA network. In one implementation, the device 102-5 may be forced to leave or migrate from the ARA network regardless of the consequences of such migration, except that the device 102-5 will not be forced to leave or migrate from the ARA network if doing so would result in the device 102-5 becoming isolated.

In one implementation, if the device 102-5 detects another ARA network and determines that the device 102-5 is able to leave or migrate from the ARA network, the device 102-5 may start to join the other ARA network as described in the example device registration section above. For example, the device 102-5 may send a request (which may or may not be encrypted using an encryption key and/or algorithm as described in the foregoing implementations) to a neighboring device 102 belonging to an adjacent ARA network to request joining to the adjacent network. Additionally, the device 102-5 may further broadcast a message to devices 102 in the network that the device 102-5 is leaving or migrating from, indicating that the device 102-5 is leaving the network. In some implementations, since the device 102-5 has successfully registered with the NMS previously when joining the ARA network of the controlling device 102-4, the device 102-5 may be exempted from some or all of an authentication process as described above (by providing a group key associated with the ARA network and/or a device identifier of the device 102-5 to a controlling device of the another ARA network, for example) when joining a new ARA network.

In one implementation, the device 102-5 may receive a new address that includes a specific prefix (e.g., an IPv6 prefix) designated to the other ARA network. Upon receiving the new address, the device 102-5 may update its old address (i.e., an address previously assigned to the device 102-5 by the controlling device 102-4) with the new address at an application level such as at an American National Standards Institute (ANSI) C12.22, DNS, etc.

In one implementation, during a time period of the migration and before completion of the migration, the device 102-5 may maintain connection or attachment to the ARA network to which it is currently or originally attached. For example, the device 102-5 may still perform normal operations in the current ARA network, including routing and forwarding packets not destined to the device 102-5, processing packets addressed to the device 102-5, replying for the packets destined to the device 102-5—if requested—via the current ARA network, etc. Additionally or alternatively, the device 102-5 may select a neighboring device 102 from the new ARA network and employ this neighboring device 102 as a relay and/or forwarding device for data packets. Additionally or alternatively, the device 102-5 may still receive data packets destined to its old address from other devices 102 in the ARA network. In some implementations, during the time period of the migration, the device 102-5 may store or cache its old address and continue to process data or data packets addressed to its old address as usual, thus maintaining a connectivity with the ARA network it is migrating from during this time period of the migration. In one implementation, if the device 102-5 has lost connection with its parent devices of the ARA network it is migrating from, the device 102-5 may drop all upstream packets (data packets transmitted to devices in a higher hierarchical level of the ARA network) from its buffer, for example. In some implementations, the device 102-5 may forward the received data packets to the ARA network it is migrating from (if still attached) during the time period of the migration. In one implementation, if the device 102-5 receives its new address and is now attached to the another ARA network (i.e., the new ARA network), the device 102-5 may "tunnel" the buffered data packets, i.e., data packets coming from its "old" ARA network, and send the received data packets (which are included or encapsulated into new packets, for example) using its new address through the new ARA network, for example.

In one implementation, upon successfully attaching or migrating to the new ARA network, the device 102-5 detaches itself or leaves from the old ARA network. In one implementation, the device 102-5 may send a message to the root node of the old ARA network to notify or announce its departure from the old ARA network. Additionally or alternatively, the device 102-5 may send messages (which indicate its departure from the old ARA network) to one or more devices 102 in the old ARA network that forward and/or route their data packets through the device 102-5. These messages (i.e., messages to the root node and/or the other devices 102 in the old ARA network) may or may not request an acknowledgement from the root node and/or the other devices 102 in the old ARA network. Furthermore, in some implementations, the device 102-5 may repeatedly send the messages to the root node and/or the other devices 102 in the old ARA network to increase or ensure the likelihood of the root node and/or the other devices 102 receiving the messages.

Additionally or alternatively, the device 102-5 may stop processing any data packets that are not destined to its old address. In one implementation, the device 102-5 may choose to process a data packet if the data packet is a data packet destined to the old address of the device 102-5, and/or a data packet (that may or may not be destined to the old address of the device 102-5) indicating a high degree of urgency or importance (as indicated by a time at which a response is needed, etc.), for example. Additionally or alternatively, the device 102-5 may choose to respond to certain types of data packets that have specific scopes or purposes if the data packets are destined to the old address of the device 102-5. By way of example and not limitation, the device 102-5 may process a data packet that carries data destined to a pre-defined set of applications and requires a response from the device 102-5. The device 102-5 may send a response via the new ARA network and use a new address of the device 102-5 in the new ARA network as a source address of the response. Additionally or alternatively, the device 102-5 may ignore or drop data packets that are not one of the specific scopes or destined to the pre-defined set of applications. In some implementations, after the device 102-5 has detached from the old ARA network and is performing normal operations in the new ARA network, the device 102-5 may still accept packets destined to the old address for a predetermined period of time which may be a default by the old or new ARA network, or may be pre-defined by an administrator of the old or new ARA network. The device 102-5 may process data packets destined to its old address (and/or data packets not destined to its old address) according to the foregoing implementations as described above.

In some implementations, the old address of the device 102-5 will not be re-distributed to another device during a certain period of time, called as a migration time period. This migration time period is set to be long enough to cover an entire ARA switching process until an entire system (including, for example, the root nodes of the old and new ARA networks, DNS server, etc.) is updated to reflect the migration of the device 102-5.

Alternative Implementations

Although the foregoing implementations describe applications in an autonomous routing area network of an advanced metering infrastructure (AMI), the present disclosure is not limited thereto. In one implementation, the present disclosure can be applied to networks such as cellular networks, home networks, office networks, etc. For example, in an event that a cellular station determines that a load on a cellular network controlled thereby exceeds a predetermined threshold, the cellular station may select and force some of mobile devices connected to its network to leave or migrate to another cellular network, thereby performing load balancing for its controlled network.

Exemplary Methods

Figure 3:
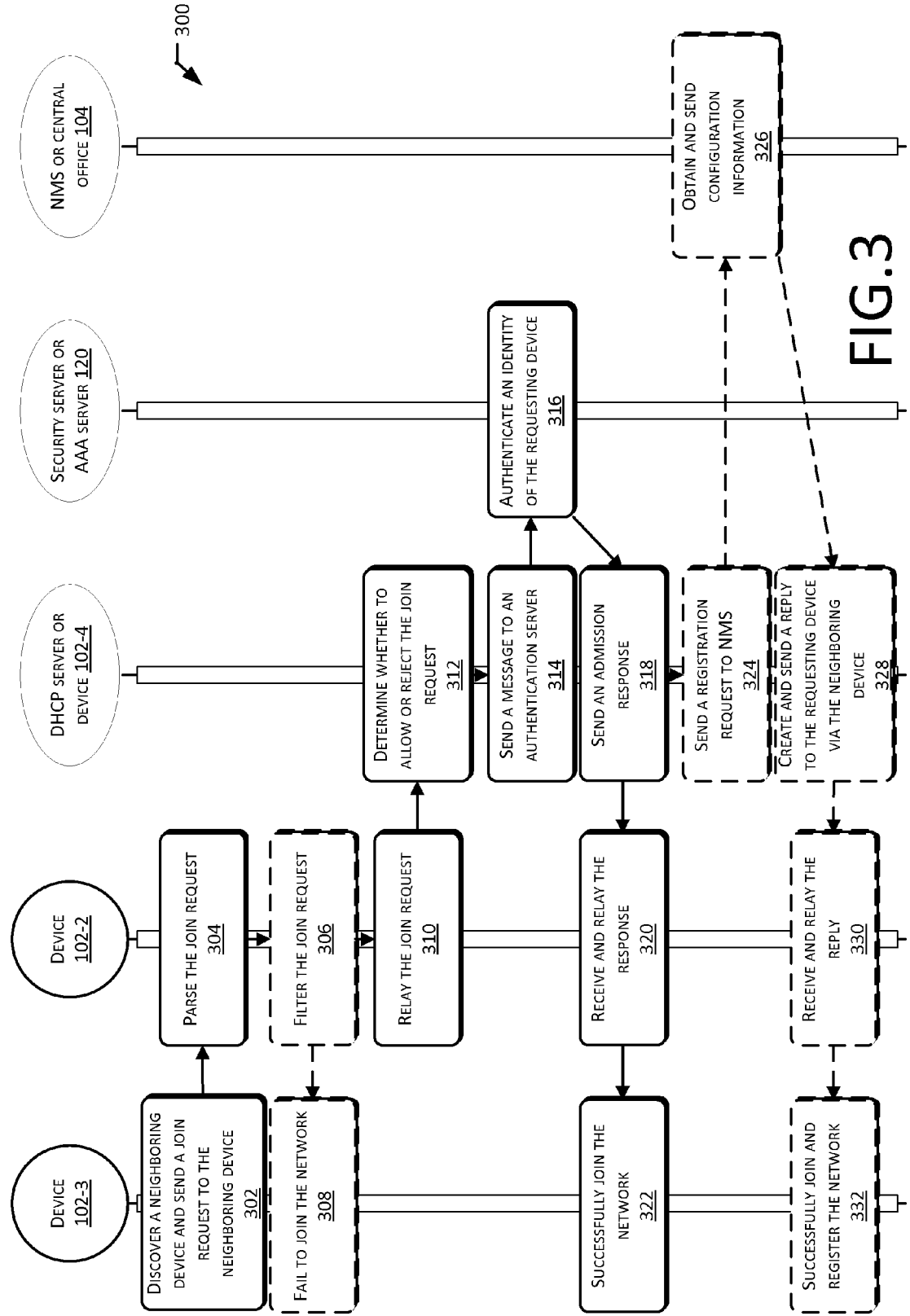
FIG. 3 illustrates an example method of device registration in a network.
Figure 4:
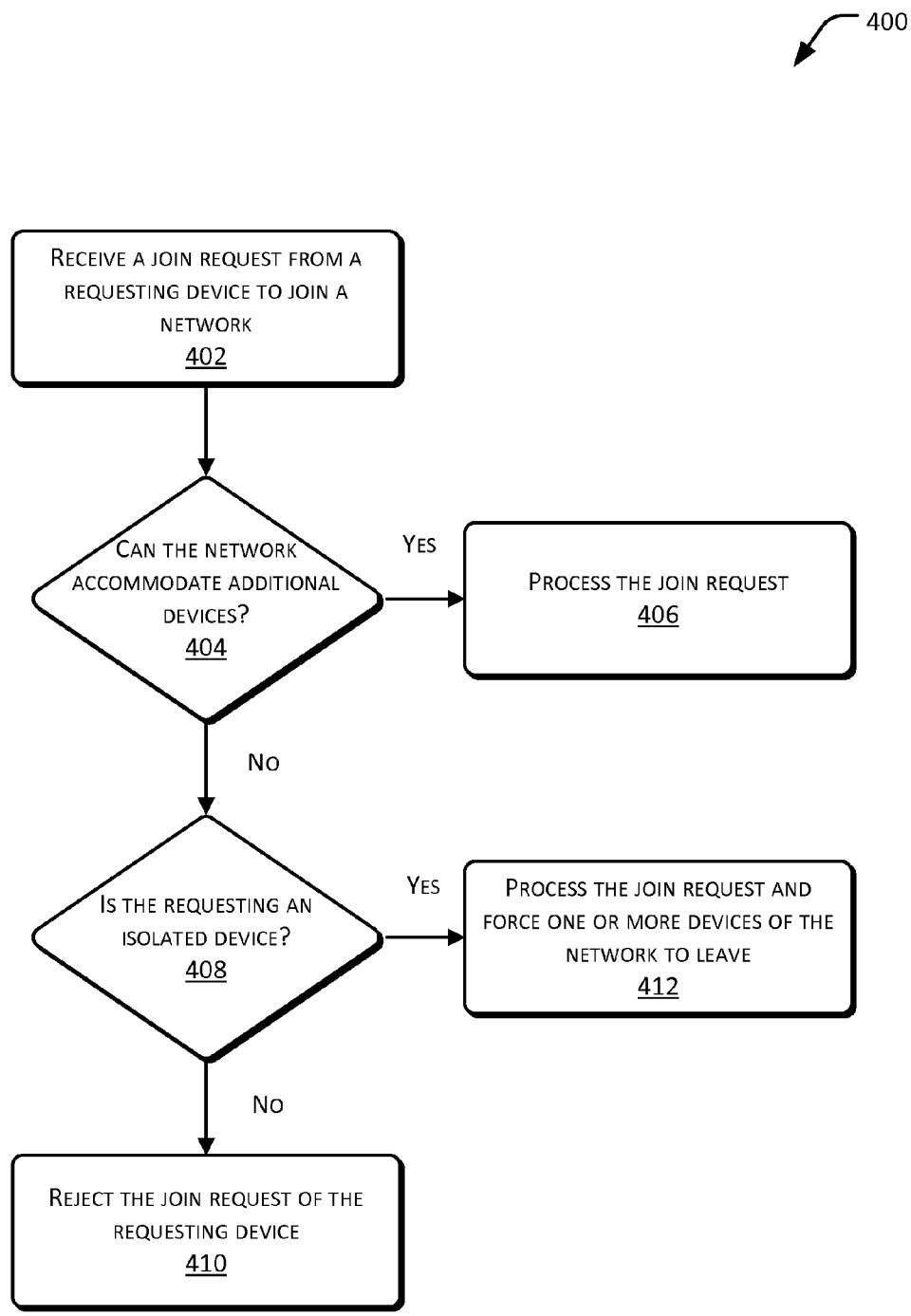
FIG. 4 illustrates an example method of determining whether to allow or reject a request of a device to join a network.
Figure 5:
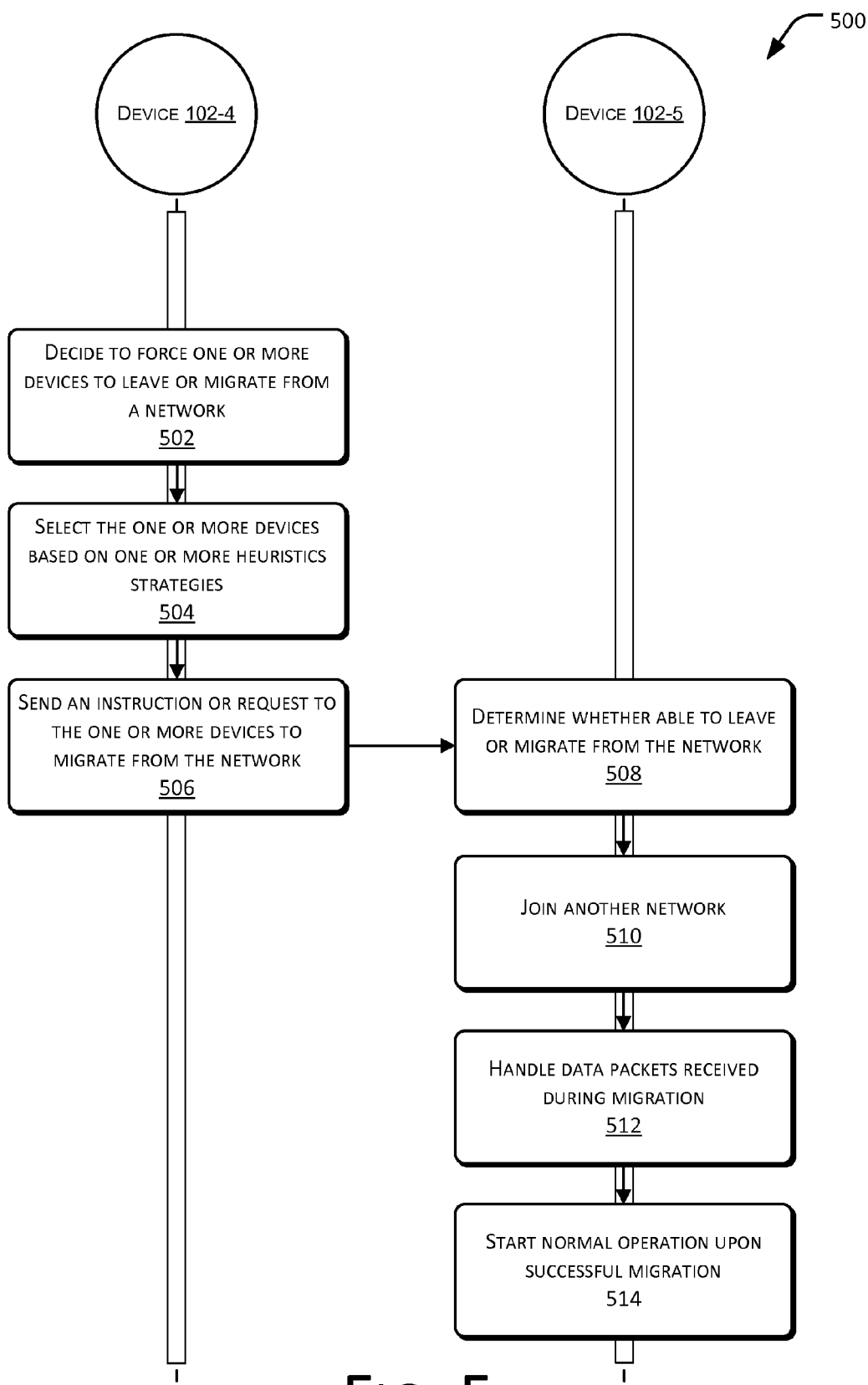
FIG. 5 illustrates an example method of device migration from one network to another.

FIG. 3 is a flow chart depicting an example method 300 of device registration in a network. FIG. 4 is a flow chart depicting an example method 400 of determination whether to allow or reject a device to join a network. FIG. 5 is a flow chart depicting an example method 500 of device migration from a network. The methods of FIG. 3, FIG. 4 and FIG. 5 may, but need not, be implemented in the environment of FIG. 1 and using the device of FIG. 2. For ease of explanation, methods 300, 400 and 500 are described with reference to FIGS. 1 and 2. However, the methods 300, 400 and 500 may alternatively be implemented in other environments and/or using other systems.

Methods 300, 400 and 500 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations.

Referring back to FIG. 3, at block 302, the requesting device 102-3 may want to join a network covering an area where the requesting device 102-3 is located. The requesting device 102-3 may discover the neighboring device 102-2 and sends a join request (e.g., a DHCPv6 request or a beacon message including the join request) to the neighboring device 102-2.

At block 304, in response to receiving the join request, the neighboring device 102-2 may parse the request and determine that the requesting device 102-3 requests to join a network of which the neighboring device 102-2 is a member.

At block 306, in response to determining that the requesting device 102-3 request to join the network, the neighboring device 102-2 may optionally filter the join request. In one implementation, the neighboring device 102-2 may determine whether to relay the join request to other devices of the network. For example, the neighboring device 102-2 may have received an instruction or request from the controlling device 102-4 that no devices except isolated devices may be accepted to the network for administrative or networking reasons such as overcrowding or overloading of the network. In this case, the neighboring device 102-2 may determine whether the requesting device 102-3 is an isolated device based on, for example, information included in the join request. In one implementation, if the neighboring device 102-2 has received the instruction or request that no devices except isolated devices may be accepted to the network and the requesting device 102-3 is not an isolated device, the neighboring device 102-2 may send a response to the requesting device 102-3, indicating that the join request is rejected. Otherwise, the neighboring device 102-2 may prepare to relay the join request of the requesting device 102-3 to other devices of the network.

At block 308, the requesting device 102-3 receives the response from the neighboring device 102-2 indicating that the join request thereof is rejected.

At block 310, the neighboring device 102-2 may relay the join request to the controlling device 102-4 or the parent device of the neighboring device 102-2 based on whether the neighboring device 102-2 knows the address of the controlling device 102-4.

At block 312, in response to receiving the join request relayed from the neighboring device 102-2, the controlling device 102-4 may determine whether to allow or reject the join request of the requesting device 102-3. In one implementation, the controlling device 102-4 may determine whether to allow the join request based on a condition of the network and/or a condition of the requesting device 102-3. If the controlling device 102-4 determines to reject the join request of the requesting device 102-3, the controlling device 102-4 may send a reply to the requesting device 102-3 via the neighboring device 102-2, indicating that the controlling device 102-4 or the network is unable to allow the requesting device 102-3 to join.

At block 314, in response to determining to allow the request of the requesting device 102-3, the controlling device 102-4 may send a message including an identifier and/or an authentication signature of the requesting device 102-3 included in the join request of the requesting device 102-3 to an authentication server (e.g., AAA server 120). In one implementation, the controlling device 102-4 may further sign or encrypt the message using a group key associated with the network or an encryption key associated with the controlling device 102-4.

At block 316, upon receiving the message, the authentication server 120 may decrypt the message if encrypted, and parse the message to obtain the identifier and/or the authentication signature of the requesting device 102-3. The authentication server 120 may then perform authentication based on the obtained identifier and/or the obtained authentication signature of the requesting device 102-3. In response to successfully authenticating an identity of the requesting device 102-3, the authentication server 120 may send a successful authentication message possibly including a group key associated with the network (which may or may not be encrypted using a public or symmetric key of the requesting device 102-3) to the controlling device 102-4. In one implementation, the public or symmetric key of the requesting device 102-3 may be known only to the requesting device 102-3 and the authentication server 120. In some implementations, the public or symmetric key of the requesting device 102-3 may further be known to other devices or servers (such as the central office 104 and/or the controlling device 102-4, for example) of the ARA network that are responsible for network management or monitoring. For example, the authentication server 120 may send the successful authentication message that further includes the public or symmetric key of the requesting device 102-3 that has been encrypted using the group key associated with the ARA network. Alternatively, if the authentication server 120 fails to authenticate the identity of the requesting device 102-3, the authentication server 120 may send a failed authentication message to the controlling device 102-4, indicating that the authentication is failed.

At block 318, in response to receiving a message from the authentication server 120, the controlling device 102-4 may determine whether the authentication of the identity of the requesting device 102-3 is successful. If failed, the controlling device 102-4 may send a reply to the requesting device 102-3 via the neighboring device 102-2, indicating that the join request of the requesting device 102-3 is denied. In response to determining that the identity of the requesting device 102-3 is successfully authenticated, the controlling device 102-4 may send an admission response to the requesting device 102-3 via the neighboring device 102-2 including a message indicating that the join request of the requesting device 102-3 is allowed. In one implementation, the response may further include, but is not limited to, a group key associated with the network that may or may not be encrypted at the authentication server using the public or symmetric key of the requesting device 102-3. Additionally or alternatively, in some implementations, the controlling device 102-4 may encrypt the response using a public or symmetric key of the requesting device 102-3 if the controlling device 102-4 knows the public or symmetric key of the requesting device 102-3, for example, from the authentication server 120. Additionally or alternatively, in one implementation, the controlling device 102-4 may encrypt the group key (and/or other information related to joining the network) using the public or symmetric key of the requesting device 102-3 (if this public or symmetric key is known to the controlling device 102-4) and encrypt the encrypted group key and/or the message using the group key associated with the network. In some implementation, the controlling device 102-4 may encrypt the group key and the message using the public or symmetric key of the requesting device 102-3, and further encrypt the encrypted group key, encrypted message, and/or other information (such as information that enables routing the response to the requesting device 102-3, e.g., an address of the neighboring device 102-2 and/or an identity of the requesting device 102-3, etc.) using the group key.

In some implementations, the controlling device 102-4 may not send an admission response to the requesting device 102-3 upon receiving a successful identity authentication of the requesting device 102-3 from the authentication server 120 (i.e., after determining that the identity of the requesting device 102-3 is successfully authenticated). In these alternative implementations, the controlling device 102-4 may optionally send a registration request to the NMS to register the requesting device 102-3 with the NMS or the central office 104 as described at block 324 below.

At block 320, the neighboring device 102-2 may receive and parse the admission response sent from the controlling device 102-4. In one implementation, if the response is encrypted using the group key associated with the network, the neighboring device 102-2 may decrypt the encrypted response. In one implementation, in response to determining that the admission response is a response related to the join request of the requesting device 102-3, the neighboring device 102-2 may relay part or all of the response to the requesting device 102-3. For example, the neighboring device 102-2 may relay part of the response that is encrypted using the public or symmetric key of the requesting device 102-3 to the requesting device 102-3.

At block 322, the requesting device 102-3 receives the response relayed from the neighboring device 102-2 and parses the response to retrieve a result of the join request and/or the group key of the network (if included). The requesting device 102-3 may start to receive data from and/or send data to other devices of the network using the group key.

At block 324, the controlling device 102-4 may optionally send a registration request to the NMS to register the requesting device 102-3 with the NMS or the central office 104. The registration request may include, but is not limited to, an identifier of the requesting device 102-3.

At block 326, in response to receiving the registration request from the controlling device 102-4, the NMS may obtain information associated with the network and information associated with the requesting device 102-3 therein or from other devices. The NMS may determine configuration information or parameters usable for the requesting device 102-3 based on the obtained information. For example, the NMS may determine configuration information or parameters usable for the requesting device 102-3 based on a type of the requesting device 102-3, a type of the network, etc. Upon determining the configuration information or parameters, the NMS may send the configuration information or parameters to the controlling device 102-4.

At block 328, in response to obtaining the configuration information or parameters from the NMS, the controlling device 102-4 may assign a new address to the requesting device 102-3. In one implementation, the controlling device 102-4 may assign a new address that includes a prefix specified or designated to the network. The controlling device 102-4 may further prepare a reply (e.g., a DHCP reply) to the requesting device 102-3. In one implementation, the reply may include, but is not limited to, the assigned new address, the configuration information or parameters, and/or the group key associated with the network. In one implementation, if the controlling device 102-4 has not sent an admission response to the requesting device 102-3 immediately after determining that the identity of the requesting device 102-3 is successfully authenticated, sending this reply from the controlling device 102-4 may indicate the successful authentication of the identity of the requesting device 102-3. In some implementations, the controlling device 102-4 may further merge information received from the authentication server 120 related to the authentication of the identity of the requesting device 102-3 into the reply. In one implementation, the controlling device 102-4 may send the reply to the requesting device 102-3 via the neighboring device 102-2 (and a router heading the network if the controlling device is located outside the network).

At block 330, the neighboring device 102-2 relays the reply from the controlling device 102-4 to the requesting device 102-3.

At block 332, the requesting device 102-3 successfully joins and registers with the network using information (e.g., the group key, the assigned address, and/or the configuration information or parameters) received in the reply. In one implementation, the requesting device 102-3 may further authenticate the network if the symmetric or asymmetric key of the requesting device 102-3 is known only to itself and one or more authorized devices and/or servers (e.g., the authentication server 120, the central office 104, and/or the controlling device 102-4). For example, the group key that is included in the reply may be encrypted using the symmetric or asymmetric key (e.g., the public key) of the requesting device 102-3. The requesting device 102-3 may therefore authenticate the network if the requesting device 102-3 can decrypt the encrypted group key using its symmetric or asymmetric key (e.g., the private key), and can successfully communicate with other devices of the ARA network using that decrypted group key. If, however, the requesting device 102-3 cannot communicate data with other devices using the decrypted group key, the requesting device 102-3 may determine that the authentication of the network fails, and leave (or disconnect from) the network accordingly.

Referring back to FIG. 4, at block 402, the controlling device 102-4 may receive a request from the requesting device 102-3 via the neighboring device 102-2. The requesting device 102-3 may include a device newly deployed within the network or a device attempting to migrate to the network from another network. In one implementation, the controlling device 102-4 may determine that the request of the requesting device 102-3 is a join request, requesting to join the network associated with the controlling device 102-4. The join request may at least include information about whether the requesting device 102-3 is an isolated device. In some implementations, the join request may further include, but is not limited to, an identity of the requesting device 102-3, etc. In one implementation, the join request may be encrypted or signed by a private or symmetric key of the requesting device 102-3. The controlling device 102-4 may decrypt the request using the public or symmetric key of the requesting device 102-3 if the request has been encrypted.

At block 404, in response to determining that the request is a join request, the controlling device 102-4 may determine whether the network has a capacity to accommodate additional devices. For example, the controlling device 102-4 may determine whether a load associated with the network is greater than or equal to a predetermined threshold. A load associated with the network may include, but is not limited to, a current number of devices, a current traffic, a current or average packet drop rate, a current or average bandwidth usage, etc.

At block 406, if the controlling device 102-4 determines that the network can accommodate additional devices, e.g., the load is less than the predetermined threshold, the controlling device 102-4 may proceed to process the join request of the requesting device 102-3 as described in the foregoing implementations, e.g., FIG. 3, with other devices and/or servers.

At block 408, if the controlling device 102-4 determines that the network cannot accommodate additional devices, e.g., the load has exceeded the predetermined threshold, the controlling device 102-4 may determine whether the requesting device 102-3 is an isolated device based on, for example, information included in the join request.

At block 410, if the controlling device 102-4 determines that the requesting device 102-3 is not an isolated device, the controlling device 102-4 may reject the join request of the requesting device 102-3 and send a response of rejection to the requesting device 102-3 via the neighboring device 102-2.

At block 412, if the controlling device 102-4 determines that the requesting device 102-3 is an isolated device, the controlling device 102-4 may proceed to process the join request of the requesting device 102-3 as described in the foregoing implementations, e.g., FIG. 3, with other devices and/or servers. Furthermore, the controlling device 102-4 may force one or more devices of the network to leave or migrate from the network as described in the foregoing implementations and will be described in FIG. 5 and accompanying descriptions below.

Referring back to FIG. 5, at block 502, the controlling device 102-4 decides to force one or more devices 102 to leave or migrate from the network. The controlling device 102-4 may make this decision based on one or more reasons such as load balancing of the network, request of an isolated device to join an already overloaded network, etc.

At block 504, the controlling device 102-4 may select one or more devices 102 in the network to leave or migrate based on one or more heuristics strategies. The one or more heuristics strategies may include, but are not limited to, selecting devices that are not isolated, selecting devices that have no or fewer number of child devices, selecting devices that are communicatively farthest from the controlling device.

At block 506, upon selecting the one or more devices to leave or migrate, the controlling device 102-4 may send an instruction or request to the one or more devices, forcing or requesting the one or more devices to leave or migrate from the network.

At block 508, in response to receiving the migration instruction or request, the one or more devices, e.g., the device 102-5, may determine that the device 102-5 is able to leave or migrate from the network. In one implementation, the device 102-5 may determine whether the device 102-5 is currently an isolated device by detecting or discovering whether one or more networks (other than the network the device 102-5 is currently a member) exist in an area in which the device 102-5 is located. The device 102-5 may send a message to the controlling device 102-4 in response to determining that the device 102-5 is unable to leave or migrate to another network.

At block 510, in response to determining that one or more networks (other than the network the device 102-5 is currently a member) exist, the device 102-5 may begin to join one of the one or more networks as described above with respect to FIG. 3, for example. Additionally, the device 102-5 may further broadcast a message to devices 102 in the network that the device 102-5 is leaving or migrating from the network.

At block 512, during a time period of migration and before completion of the migration, in response to receiving data packets destined to an "old" address (i.e., an address assigned to the device 102-5 by the network from which the device 102-5 is leaving or migrating) of the device 102-5, the device 102-5 may drop the data packets, or forward the data packets to other devices in the network that the device 102-5 is still connected to.

At block 514, upon successfully obtaining the new address and attaching to the new network, the device 102-5 may start performing its normal or assigned operations or functions in the new network.

Although FIG. 5 describes that the device 102-5 may be forced or instructed to leave or migrate from the ARA network by the controlling device 102-4, in some implementations, the device 102-5 actually initiates on its own to leave or migrate from the ARA network to another ARA network. By way of example and not limitation, the device 102-5 may decide or initiate to leave or migrate from the ARA network to another ARA network based on one or more network conditions associated with the device 102-5 and/or the ARA network. For example, the device 102-5 may initiate to migrate from the ARA network to another ARA network if a communication quality (e.g. a link-layer communication quality) with the device 102-5 is poor or degraded, for example, below a predetermined quality threshold. Additionally or alternatively, the device 102-5 may migrate from the ARA network to another ARA network if the router of the ARA network fails. Additionally or alternatively, the device 102-5 may, while attached to the current ARA network, listen it an environment thereof, and detect or discover existence of other adjacent ARA networks. The device 102-5 may learn about performance/quality of service offered by these adjacent networks. The device 102-5 may migrate from the ARA network to another ARA network if the other ARA network offers a better performance/quality of service than the ARA network to which the device 102-5 is currently attached.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. One or more non-transitory computer-readable media having computer-readable instructions therein that, when executed by one or more processors, perform acts comprising:
    receiving, at a utility metering device, an instruction to leave a current network to which the utility metering device is currently connected;
    in response to receiving the instruction, determining whether one or more other networks exist that the utility metering device is capable of joining;
    responsive to determining that one or more other networks exist that the utility metering device is capable of joining, selecting a network from the one or more other networks and sending a request to join the selected network; and
    responsive to determining that the utility metering device is incapable of joining any other network, sending, by the utility metering device, a response to the current network indicating that the utility metering device is unable to leave the current network.

2. The one or more non-transitory computer-readable media of claim 1, the acts further comprising:
    receiving a response from the selected network indicating that the utility metering device is allowed to join the selected network; and
    migrating from the current network to the selected network based on information provided in the response from the selected network.

3. The one or more non-transitory computer-readable media of claim 2, wherein the information provided in the response from the selected network comprises a group key associated with the selected network, configuration information for the utility metering device to join the selected network, and a new address assigned to the utility metering device.

4. The one or more non-transitory computer-readable media of claim 3, the acts further comprising updating an old address of the utility metering device with the new address and receiving packets destined to the new address upon the migrating.

5. The one or more non-transitory computer-readable media of claim 2, the acts further comprising:
    prior to a completion of the migrating and in response to receiving a packet at an old address of the utility metering device:
        dropping the received packet;

forwarding the received packet to the current network when a connection between the utility metering device and the current network still exists; or including the received packet in a new packet and sending the new packet using a new address of the utility metering device upon receiving a new address assigned to the utility metering device.

6. A utility metering device, comprising:

a processor; and a transceiver communicatively coupled to the processor and to a current network, wherein the processor is configured to:

receive, via the transceiver, an instruction to leave the current network to which the utility metering device is currently connected;

in response to receiving the instruction, determine whether one or more other networks exist that the utility metering device is capable of joining;

responsive to determining that one or more other networks exist that the utility metering device is capable of joining, select a network from the one or more other networks and send a request to join the selected network; and responsive to determining that the utility metering device is incapable of joining any other network, send a response to the current network indicating that the utility metering device is unable to leave the current network.

7. The utility metering device of claim 6, wherein the processor is further configured to:

receive a response from the selected network indicating that the utility metering device is allowed to join the selected network; and migrate from the current network to the selected network based on information provided in the response from the selected network.

8. The utility metering device of claim 7, wherein the information provided in the response from the selected network comprises a group key associated with the selected network, configuration information for the utility metering device to join the selected network, and a new address assigned to the utility metering device.

9. The utility metering device of claim 8, wherein the processor is further configured to:

update an old address of the utility metering device with the new address; and receive packets destined to the new address upon the migrating.

10. The utility metering device of claim 7, wherein the processor is further configured to, prior to a completion of the migrating and in response to receiving a packet at an old address of the utility metering device:

drop the received packet;

forward the received packet to the current network when a connection between the utility metering device and the current network still exists; or include the received packet in a new packet and send the new packet using a new address of the utility metering device upon receiving a new address assigned to the utility metering device.

11. A method of evaluating an instruction to leave a network, the method comprising:

receiving, at a utility metering device, an instruction to leave a current network to which the utility metering device is currently connected;

in response to receiving the instruction, determining whether one or more other networks exist that the utility metering device is capable of joining;

responsive to determining that one or more other networks exist that the utility metering device is capable of joining, selecting a network from the one or more other networks and sending a request to join the selected network; and responsive to determining that the utility metering device is incapable of joining any other network, sending, by the utility metering device, a response to the current network indicating that the utility metering device is unable to leave the current network.

12. The method of claim 11, further comprising:

receiving a response from the selected network indicating that the utility metering device is allowed to join the selected network; and migrating from the current network to the selected network based on information provided in the response from the selected network.

13. The method of claim 12, wherein the information provided in the response from the selected network comprises a group key associated with the selected network, configuration information for the utility metering device to join the selected network, and a new address assigned to the utility metering device.

14. The method of claim 13, further comprising:

updating an old address of the utility metering device with the new address and receiving packets destined to the new address upon the migrating.

15. The method of claim 12, further comprising, prior to a completion of the migrating and in response to receiving a packet at an old address of the utility metering device:

dropping the received packet;

forwarding the received packet to the current network when a connection between the utility metering device and the current network still exists; or including the received packet in a new packet and sending the new packet using a new address of the utility metering device upon receiving a new address assigned to the utility metering device.

\* \* \* \* \*